US012443148B2

(12) United States Patent
Born et al.

(10) Patent No.: US 12,443,148 B2
(45) Date of Patent: Oct. 14, 2025

(54) WATCH COMPRISING A SOLAR CELL

(71) Applicant: The Swatch Group Research and Development Ltd, Marin (CH)

(72) Inventors: Jean-Jacques Born, Morges (CH); Cédric Nicolas, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 354 days.

(21) Appl. No.: 18/165,671

(22) Filed: Feb. 7, 2023

(65) Prior Publication Data

US 2023/0341820 A1 Oct. 26, 2023

(30) Foreign Application Priority Data

Apr. 22, 2022 (EP) .................................... 22169468

(51) Int. Cl.
*G04C 10/02* (2006.01)
*G04B 37/08* (2006.01)
*G04B 39/00* (2006.01)

(52) U.S. Cl.
CPC ............. *G04C 10/02* (2013.01); *G04B 37/08* (2013.01); *G04B 39/002* (2013.01)

(58) Field of Classification Search
CPC ...... G04C 10/02; G04B 37/08; G04B 39/002; G04G 17/02; G04G 17/08; G04G 19/00
See application file for complete search history.

(56) References Cited

U.S. PATENT DOCUMENTS

| | | | | |
|---|---|---|---|---|
| 6,099,761 A * | 8/2000 | Aoki | G04B 19/12 264/654 |
| 10,018,968 B2 * | 7/2018 | Willemin | G04C 10/02 |
| 2021/0011435 A1 * | 1/2021 | Keller | G04C 10/02 |

FOREIGN PATENT DOCUMENTS

| | | |
|---|---|---|
| EP | 1 574 919 A1 | 9/2005 |
| EP | 1 586 963 A1 | 10/2005 |
| JP | S60-146887 U | 9/1985 |
| JP | 2003-121567 A | 4/2003 |
| JP | 2005-114650 A | 4/2005 |
| JP | 2006-184059 A | 7/2006 |
| JP | 2010-210295 A | 9/2010 |

OTHER PUBLICATIONS

European Search Report for EP 22 16 9468 dated Sep. 7, 2022.

* cited by examiner

*Primary Examiner* — Edwin A. Leon
(74) *Attorney, Agent, or Firm* — Sughrue Mion, PLLC

(57) ABSTRACT

A watch including a gasket (18) arranged at the periphery of the glass (14), an intermediate portion (20) laterally surrounding the analogue display and defining a radial surface forming an axial stop for the glass, a solar cell (30) extending at least mostly between the lower level of the dial and the glass and being arranged behind the intermediate portion, which is formed at least partially by a translucent or transparent material and configured to make it possible for the incident light to propagate in the intermediate portion and to subsequently reach the solar cell. The gasket is also formed at least mostly by a translucent or transparent material and it forms with the intermediate portion axially a continuous medium. In variants, the gasket is arranged axially adjacent to the intermediate portion or it is axially separated from the intermediate portion by a translucent or transparent intermediate medium.

11 Claims, 4 Drawing Sheets

WATCH COMPRISING A SOLAR CELL

CROSS-REFERENCE TO RELATED APPLICATIONS

This application claims priority to European Patent Application No. 22169468.0 filed Apr. 22, 2022, the entire contents of which are incorporated herein by reference.

TECHNICAL FIELD OF THE INVENTION

The invention relates to the field of watches provided with at least one solar cell. More particularly, the invention relates to a watch having a power supply source, a solar cell arranged at least mostly between the movement incorporated in a case and the glass of this case covering an analogue display of the time and behind an annular portion, particularly a spacer or a flange, laterally surrounding the analogue display, this annular portion being at least partly translucent or transparent and arranged in such a way as to make it possible for the light passing through the glass to reach the solar cell.

TECHNOLOGICAL BACKGROUND

The documents EP 3093717 and JP 6474326 B describe watches such as defined in the field of the invention above. In both cases, the case of the watch comprises a middle-bezel having an annular portion protruding relative to an inner wall of the middle and forming a shoulder whereon the edge of the glass is bearing. This annular portion is provided in the material of the middle-bezel, this material generally being opaque, in particular a metal or a ceramic. In addition, the watch of the document JP 6474326 B comprises a conventional gasket that is arranged at the periphery of the glass between a lateral surface of this glass and a vertical wall of the case. The document EP 3093717 does not show such a gasket, but this certainly results from a simplified drawing. The watches described in these two documents have an intermediate portion laterally surrounding the analogue display and a solar cell extending mostly axially between the movement and the glass, behind the intermediate portion relative to the analogue display. This intermediate portion is formed by a material that at least partially transmits light (this material thus defining a translucent or transparent medium, that is to say a non-opaque medium) and being configured in such a way as to make it possible for the visible and/or infra-red light, which passes through the glass and arrives in the space of the analogue display, to propagate in the translucent or transparent material and to subsequently reach the solar cell. Finally, it will be noted that the solar cell is arranged in a region located radially beyond the rim of the glass.

The embodiments described above make it possible to collect, for the solar cell, only the light that is in the space of the analogue display between the glass and the dial and that passes radially through the intermediate portion located between the annular portion protruding from the case, forming the support of the glass, and the dial. The amount of light energy that may be captured by the solar cell is therefore limited, especially if the dial is not very reflective. Subsequently, the translucent or transparent nature of the intermediate portion in these embodiments may pose an aesthetic problem for conventional watches that generally comprise a flange, located between the dial and the glass, having an opaque appearance and in particular a metal reflection.

SUMMARY OF THE INVENTION

The objective of the present invention is to increase the amount of light that can be received by the solar cell in a watch having a solar cell arranged mostly behind an intermediate portion made of translucent or transparent material and surrounding the analogue display or, alternatively, to make it possible to produce a watch having a solar cell arranged radially behind such an intermediate portion by keeping an opaque appearance, particularly metal, for an observer looking at the inner surface of this intermediate portion through the glass of the watch, while ensuring that the solar cell receives enough light to make it possible to supply all or part of the movement incorporated in the watch. The second objective concerns the aesthetic appearance of a watch having a solar cell arranged behind an intermediate portion laterally delimiting the space of the analogue display, in particular a watch the case of which is provided in metal or ceramic.

To this end, the invention relates to a watch comprising a case, a movement provided with an analogue display and defining a main axis of the case that is orthogonal to the general plane of this case, a glass located above the analogue display, a gasket arranged at the periphery of the glass between a lateral surface of this glass and an axial wall of the case, an intermediate portion laterally surrounding the analogue display, a solar cell (being understood its active area capturing visible and/or infra-red light) extending at least mostly between the movement and the glass and being arranged behind the intermediate portion relative to the analogue display. The intermediate portion is formed at least partially by a translucent or transparent material and is configured in such a way as to make it possible for the visible and/or infra-red light passing through the glass from the outside of the watch to propagate in said translucent or transparent material and to subsequently reach the solar cell. This solar cell is arranged in a region located radially beyond the rim of the glass. Subsequently, the intermediate portion defines a radial surface forming an axial stop for a peripheral area of the glass following the inside of its rim. The gasket is also formed at least mostly by a translucent or transparent material that defines at least mostly an axial surface against which the lateral surface of the glass presses. In addition, the gasket forms with the outer portion of the intermediate portion a continuous medium or is arranged axially adjacent to this outer portion or is axially separated from this outer portion at least mostly by a translucent or transparent intermediate medium, the gasket being configured in such a way as to make it possible for the incident visible and/or infra-red light on its axial surface or on its upper surface to propagate in the translucent or transparent material that forms it up to a lower geometrical surface or lower surface delimiting at the bottom the gasket. The outer portion of the intermediate portion is arranged in such a way as to be able to substantially collect the visible and/or infra-red light passing through the lower geometrical surface or lower surface of the gasket and to make it possible for this collected visible and/or infra-red light to propagate in the translucent or transparent material of the intermediate portion and to subsequently reach at least partly the solar cell.

In an advantageous embodiment, the gasket is integral with at least one outer portion of the intermediate portion and it forms with this at least one outer portion a single portion made of the same translucent or transparent material. In an advantageous variant, the gasket is integral with the intermediate portion and forms with this intermediate portion a single part made of the same translucent or transparent material.

In a first particular variant, the intermediate portion comprises an inner portion delimiting a space for the analogue display, this inner portion comprising a translucent diffuser defining the inner surface of the intermediate portion visible through the glass. Preferably, at least one outer portion of the intermediate portion is made of a transparent material.

In a second particular variant, the intermediate portion comprises an inner portion delimiting a space for the analogue display, this inner portion comprising a semi-transparent film defining the inner surface of the intermediate portion visible through the glass, this semi-transparent film being arranged in such a way as to partially transmit the incident light from the space reserved at the analogue display while masking the solar cell for a user looking, in normal light conditions, at said inner surface through the glass. Preferably, the semi-transparent film is arranged in such a way as to have a metal appearance on the side of said space for the user looking at the inner surface of the intermediate portion through the glass.

In a main variant, the radial surface of the intermediate portion is at least mostly defined by the translucent or transparent material forming this intermediate portion, which is arranged in such a way as to make it possible that the visible and/or infra-red light passing through the radial surface can propagate in the translucent or transparent material forming the intermediate portion and subsequently reach at least partly the solar cell.

In an advantageous variant, the intermediate portion has a lower surface that is covered by a reflective layer, this intermediate portion forming a translucent or transparent medium between at least the lower geometrical surface or lower surface of the gasket and the reflective layer.

BRIEF DESCRIPTION OF THE FIGURES

The invention will be described in more detail hereinafter with reference to the accompanying drawings, given by way of examples that are in no way limiting, wherein.

DETAILED DESCRIPTION OF THE INVENTION

With reference to the figures, miscellaneous embodiments and variants of a watch according to the invention will be described hereinafter.

A first embodiment is shown in FIGS. 1 to 6.

Figure 1:
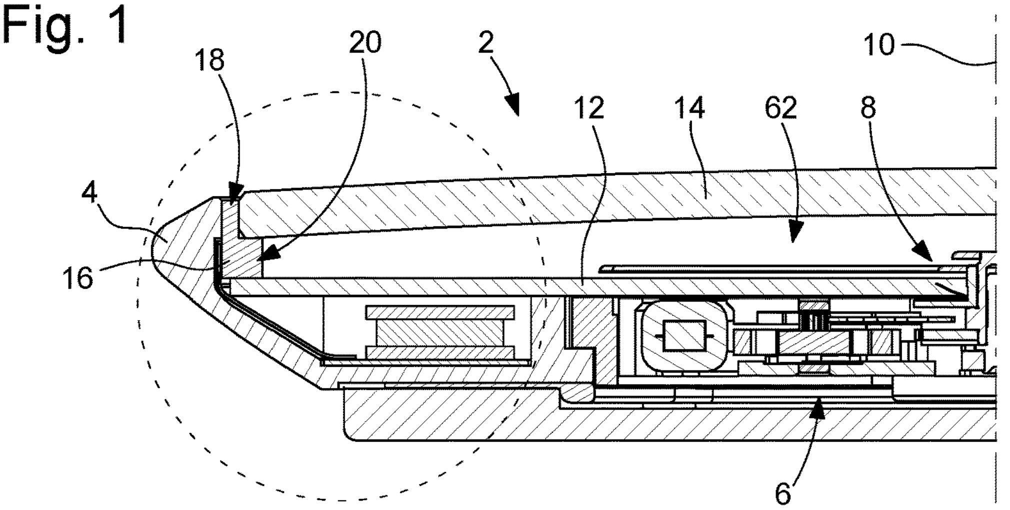
FIG. 1 is an axial section of a watch according to a first embodiment of the invention.
Figure 2:
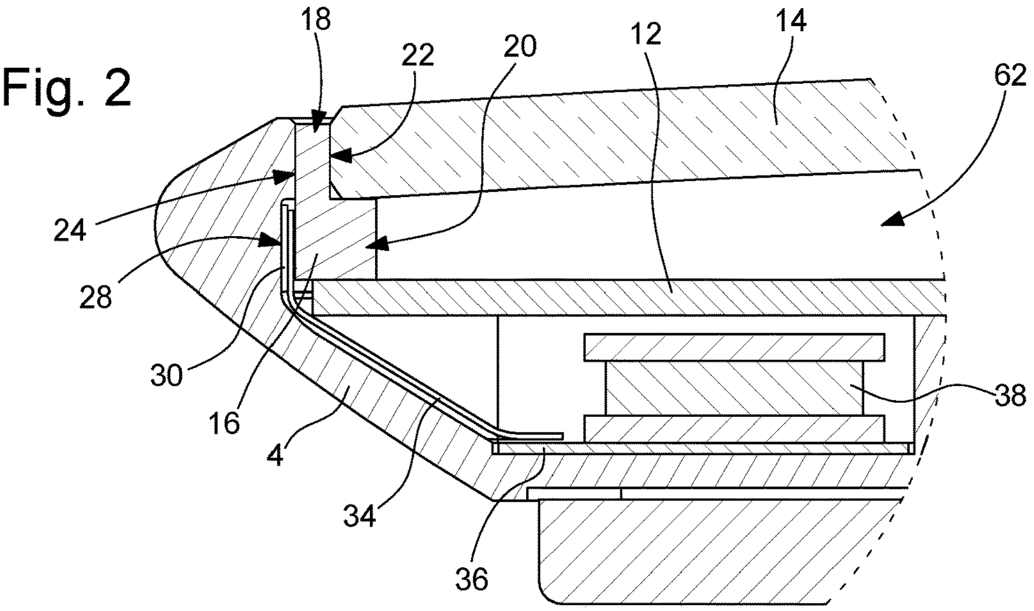
FIG. 2 is a partial enlargement of FIG. 1.
Figure 3:
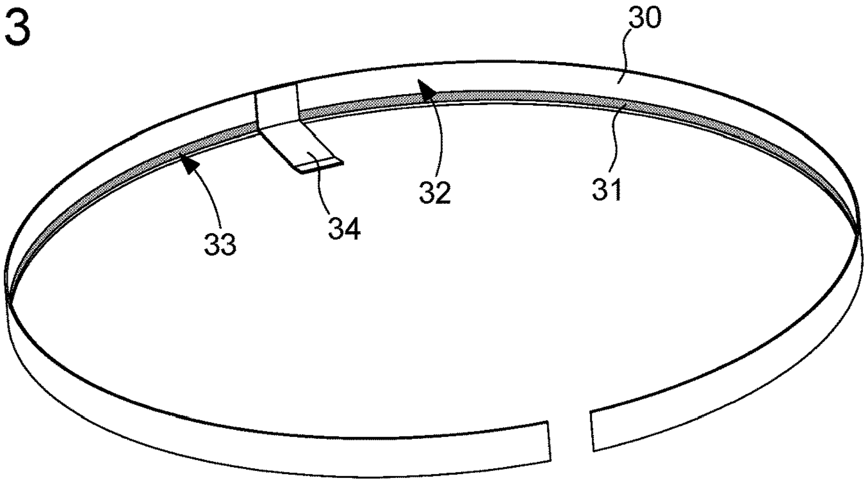
FIG. 3 is a perspective view of a solar cell that is incorporated in the case of the watch of FIG. 1.
Figure 4:
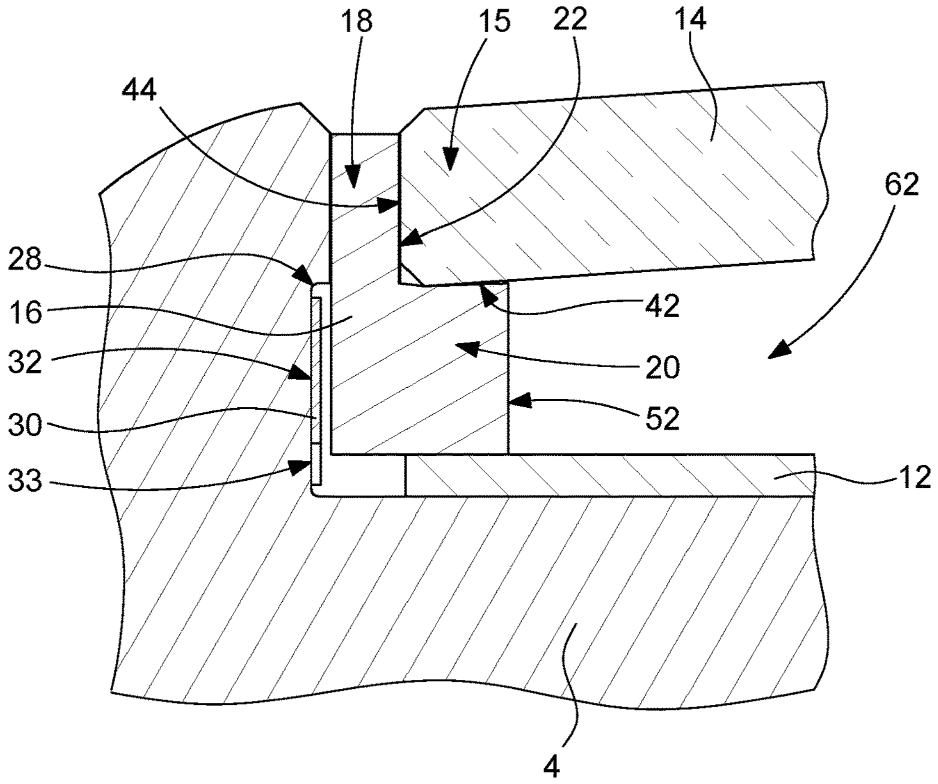
FIG. 4 is another axial section, according to another radial direction, of the watch of FIG. 1.

The watch 2 comprises a case 4, a movement 6 provided with an analogue display 8 and defining a main axis 10 of the case, orthogonal to the general plane of this case that is parallel to the dial 12, a glass 14 located above the analogue display 8, a part 16 forming in its upper portion a gasket 18 arranged at the periphery of the glass between a lateral surface 22 of this glass and an upper vertical wall 24 of the case. The part 16 also forms an intermediate portion 20 laterally surrounding the analogue display and located between the glass and the dial. The watch 2 also comprises a solar cell 30 extending between the movement 6 and the glass 14 and being arranged behind the intermediate portion 20 relative to the analogue display 8. The solar cell 30 comprises an active area 32 and a connection area 33 arranged below the active area, this connection area comprising an annular track 31 located on the inside and forming a first electrode of the solar cell. The second electrode is formed by a very thin metal substrate located on the outside of the solar cell, behind a photosensitive layer made of silicon deposited on this metal substrate. By definition in the present description, the active area of the solar cell consists of its upper portion that extends from the annular track 31, the separation line between the active area and the connection area being defined by the upper edge of the annular track. The solar cell 30 is arranged in a region located radially beyond the rim of the glass 14, defined by the lateral surface 22, in a recess 28 forming a shallow, circular bed, in the case 4 for this solar cell 30, which is thus located slightly set back from the upper vertical surface 24 of the case. In FIG. 3, it is observed that the solar cell has two lateral portions that extend in a horizontal general plane respectively from the two sides of a connector 34, which electrically connects the solar cell to an electronic module comprising a PCB 36, whereon is welded or glued (with the aid of a conductive adhesive) the connector, and a voltage booster 38 that powers a battery or a rechargeable storage capacity. The solar cell 30 has a certain elasticity so that it remains in position in the circular bed 28 once installed in this bed. Subsequently, the length of the two lateral portions is provided in such a way that the cell substantially covers the whole of the back of the recess 28, preferably by having the two respective ends of these two lateral portions that superimpose a little in an area diametrically opposite to that of the connector 34.

It will be noted that a bonding point may be provided between the two superimposed ends. It is also possible to provide the glue at least partially on the back of the solar cell so that it is glued to the back of the bed 28.

The intermediate portion 20 is formed by a translucent material and is configured in such a way as to make it possible for the visible and/or infra-red light passing through the glass 14 from the outside of the watch to propagate in the translucent material and to subsequently reach the solar cell 30. The intermediate portion 20 defines a radial surface 42 forming an axial stop for a peripheral area 15 of the glass following the inside of its rim. It is defined for the intermediate portion an outer portion 46, in the vertical extension of the gasket, and an inner portion 48 (separated in FIG. 5 by geometrical line 52) that forms the radial surface supporting the glass.

The gasket 18 is also formed by a translucent material that defines an axial surface 44 against which the lateral surface 22 of the glass presses. The gasket here forms a continuous translucent medium with the outer portion 46 of the intermediate portion 20 and is configured in such a way as to make it possible for the incident visible and/or infra-red light on its axial surface 44 and/or on its upper surface 45 to propagate in the translucent material that forms it up to a lower geometrical surface 50 delimiting at the bottom the gasket. The intermediate portion, in particular the outer portion 46 of the latter, is arranged in such a way as to be able to substantially collect the visible and/or infra-red light passing through the lower geometrical surface 50 of the gasket and to make it possible for this collected visible and/or infra-red light to propagate in the translucent material of the intermediate portion, in particular of the outer portion of the latter, and to subsequently reach at least partly the solar cell 30. In this first advantageous embodiment, the gasket 18 is integral with the intermediate portion 20 and forms with this intermediate portion a single part 16 that is made of the same translucent material.

The result of the present invention is that the arrangement of the translucent part 16 makes it possible for the incident visible and/or infra-red light on the inner axial surface 44 and on the upper surface 45 of the gasket 18, formed by this part 16, to propagate in the translucent material that forms it and subsequently in the intermediate portion 20, in particular in its outer portion 46, up to the solar cell 30, which is configured and arranged in the case 4 in such a way as to be able to capture this visible and/or infra-red light, particularly that corresponding to the maximum of the light spectrum captured effectively by the solar cell. Thus, not only may the light having penetrated through the glass in the inner space 62 provided for the analogue display reach the solar cell via the inner surface 52 of the intermediate portion, as in the prior art, but also the incident light on the gasket 18, namely on its upper surface 45 and on its inner axial/vertical surface 44. Thus, the amount of light able to be captured by the solar cell is increased.

In a particular variant making it possible to also increase the amount of light captured by the solar cell 30, the part 16 is made of a transparent material, that is to say forming a transparent medium for at least one useful portion of the light spectrum of the visible and/or infra-red light. In variants or other embodiments, some of which are subsequently presented, the inner surface of the intermediate portion is made opaque, semi-transparent or translucent for an observer who looks at this inner surface through the glass, in such a way as to give a conventional appearance to the watch.

According to a preferred variant, the radial surface 42 of the intermediate portion 20 is at least mostly defined by the translucent material forming this intermediate portion, more particularly its inner portion, or, in the particular variant mentioned above, by the transparent material forming the intermediate portion, more particularly its inner portion. This makes it possible to increase the amount of incident light on the upper face of the watch that may reach the solar cell 30. In the preferred variant described here, the radial surface 42 of the intermediate portion 20, forming an axial stop for the glass that generally rests on this radial surface, is entirely defined by the translucent material forming the intermediate portion 20, more particularly its inner portion 48. It will be noted that, in other variants or other embodiments partly described in the following, the radial surface 42 is almost entirely or mostly defined by the transparent or translucent material forming the intermediate portion, only one film or one internal annular portion, defining an inner area of the radial surface, not being translucent or transparent. In general, the radial surface of the intermediate portion is therefore at least mostly defined by the translucent or transparent material forming this intermediate portion, which is arranged in such a way as to make it possible that the visible and/or infra-red light passing through the radial surface can propagate in the translucent or transparent material forming the intermediate portion and subsequently reach at least partly the solar cell.

In the first embodiment, the intermediate portion 20 forms a spacer between the glass 14 and the dial 12, that is to say that it defines, optionally with an additional lower reflective sheet or layer if applicable, the spacing between the dial and the glass that are both in contact with this spacer. This spacer also forms a flange according to the horological terminology, that is to say that it extends from the inside between the dial and the glass, without necessarily bearing on the dial and therefore without necessarily being in contact with the dial but by covering the edge of the dial and by defining the inner surface that visually delimits the space for the analogue display. In general, the flange also defines the radial surface forming an axial stop and a bearing for the edge of the watch glass, as is the case in the embodiments described.

Figure 5:
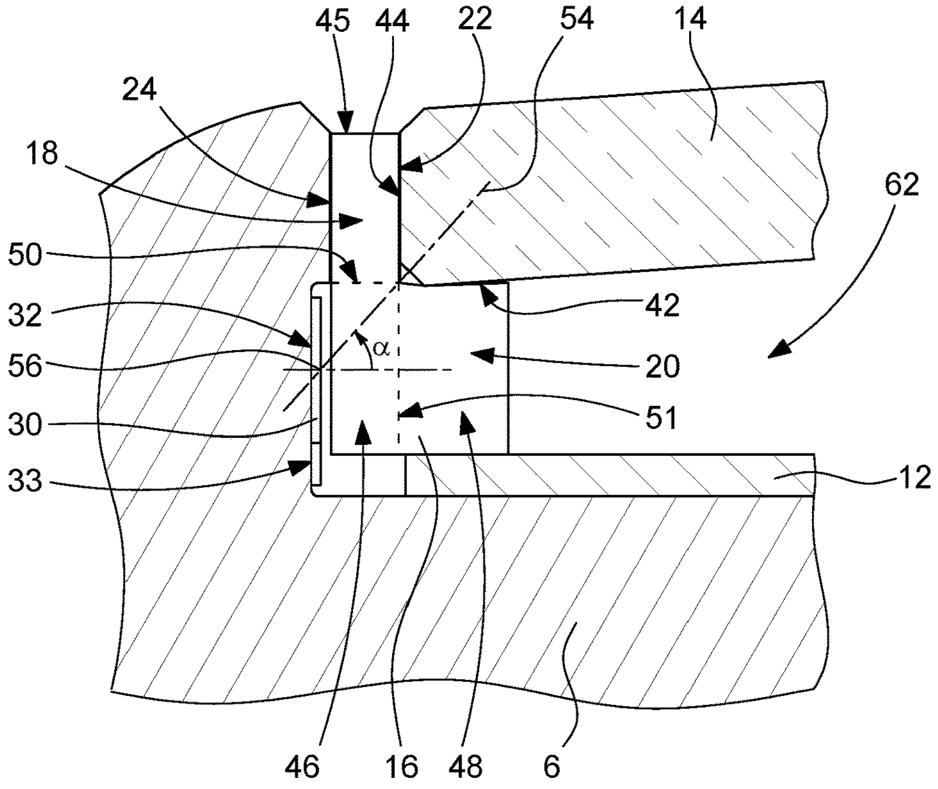
FIG. 5 is a view similar to that of FIG. 4 with in addition construction lines defining the configuration of a part made of translucent material forming a flange between the dial and the glass and jointly a gasket between this glass and an upper vertical wall of the case.

As indicated in FIG. 5, according to an advantageous variant, the gasket and the intermediate portion are configured in such a way that, in an axial plane parallel to the main axis 10, an oblique geometrical line 54 passing through the medium 56 of the active area 32 of the solar cell 30 and the junction point between the radial surface 42 of the intermediate portion and the axial surface 44 of the gasket 18 forms an angle $\alpha$ the value of which is between 35° and 70°. In a preferred variant, the value of said angle $\alpha$ is between 40° and 65°.

Figure 6:
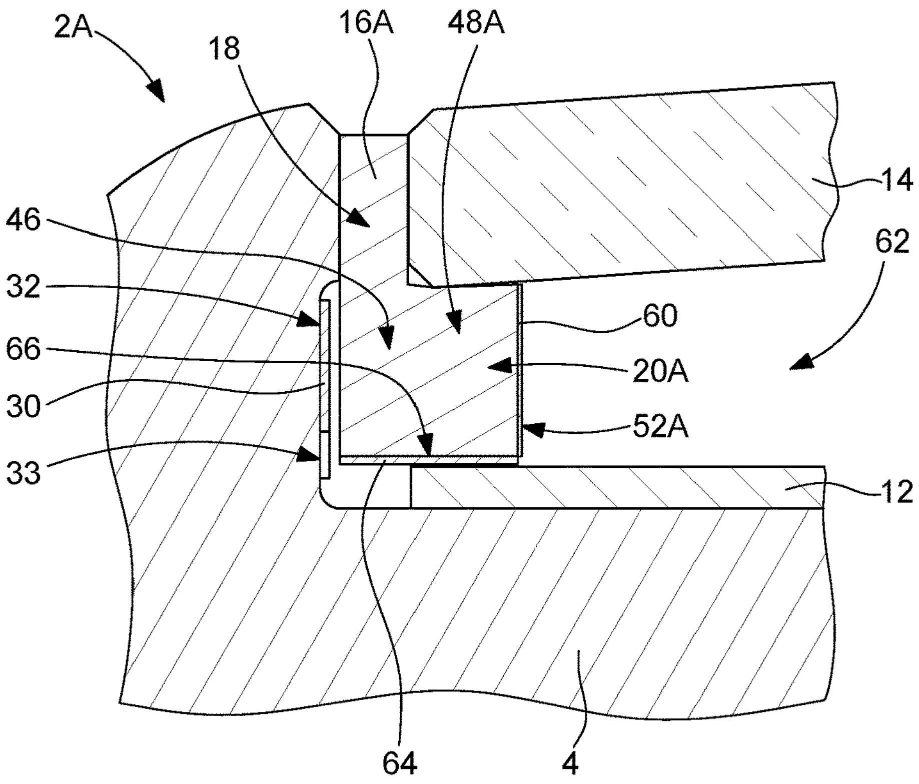
FIG. 6 is a section, according to the same sectional plane as that of FIG. 4, of an alternative embodiment.

FIG. 6 shows an alternative embodiment. The watch 2A of this variant is different from the variant shown in FIG. 4 by the fact that the intermediate portion 20A of the part 16A, more particularly its inner portion 48A, comprises a semi-transparent film 60 defining the inner surface 52A of the intermediate portion that is visible through the glass 14. This semi-transparent film partially transmits the incident light from the space 62, reserved at the analogue display, while masking the solar cell 30 for a user looking, in normal light conditions, at the inner surface 52A through the glass 14. This variant is particularly advantageous for conventional watches having a case formed of a metal material. It will be noted that the semi-transparent film may in another variant have an appearance other than metal, particularly an appearance similar to a ceramic or, more generally, any opaque appearance.

According to another advantageous variant, also shown in FIG. 6, the intermediate portion 20A has at its lower surface 66 a reflective lower layer, particularly a reflective metal film 64 that is deposited on the lower surface. This reflective layer or this reflective film reflects upwards the useful light that arrives on it, so as to send back at least partly this incident light in the direction of the solar cell 30. According to miscellaneous variants, this layer or this film may either generate a conventional reflection, or generate a reflective diffraction that concentrates the reflection in an oblique direction oriented towards the solar cell 30. In an alternative to the diffractive version, the internal surface of the reflective layer or of the reflective film or the lower surface 66 may have a structuring that mainly generates an oblique reflection for an incident light ray in the vertical/axial direction, so as to favour an oblique reflection in the direction of the solar cell. In general, the intermediate portion has a lower surface that is covered by a reflective layer, this intermediate portion forming a translucent or transparent medium between at least the lower geometrical surface or the lower surface (following variants) of the gasket and the reflective layer.

Figure 7:
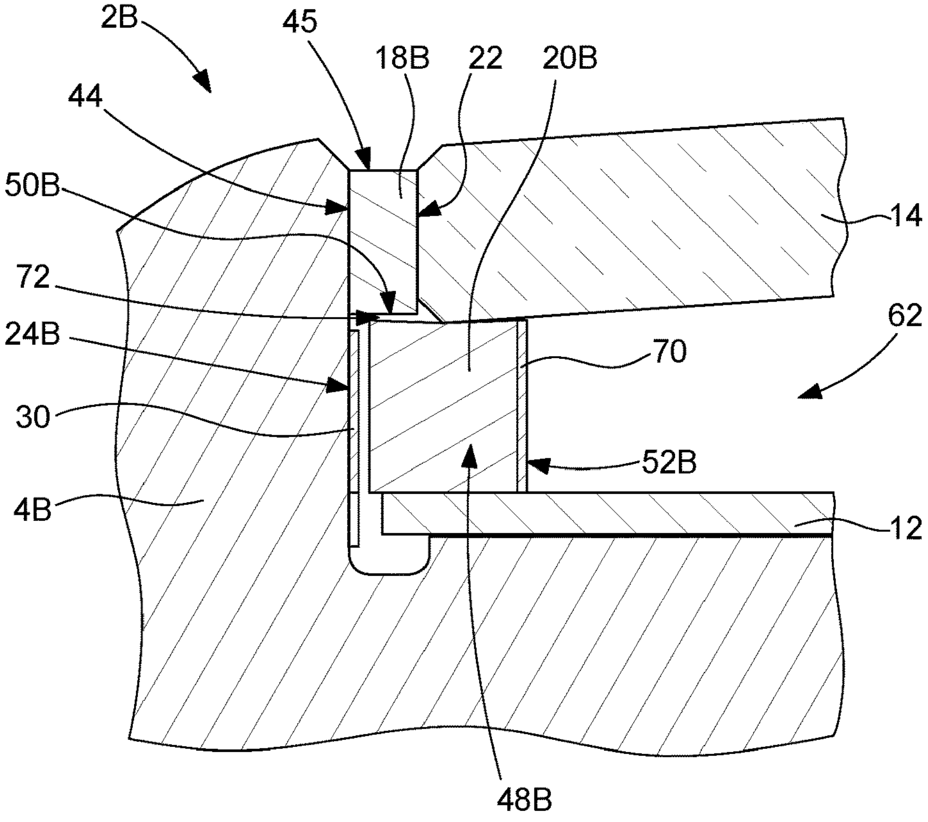
FIG. 7 is a section, according to the same sectional plane as that of FIG. 4, of a first variant of a second embodiment of a watch according to the invention.

FIG. 7 shows in section a first variant of a second embodiment of a watch 2B according to the invention, this first variant having a plurality of differences relative to the variants described of the first embodiment. Not all of the references already described will be described again. This second embodiment is different from the first embodiment mainly by the fact that the gasket 18B and the intermediate portion 20B form two distinct parts. In the first variant, these two distinct parts are separated by an air gap 72 forming a transparent intermediate medium between the gasket and the intermediate portion. This first variant is different from the preceding alternative embodiments also by the fact that the solar cell 30 is not arranged in an internal circular recess of the case 4, as in the variants of the first embodiment shown in the figures, but against the internal vertical wall 24B of the case 4B that defines a cylindrical surface extending from the top of the gasket 18B, against which the latter bears by its rear surface, up to the bottom of the solar cell 30 (similar to that shown in FIG. 3). Thus, the solar cell, which has a low thickness, is located in the vertical extension of the rear area of the gasket.

The gasket 18B is made of a translucent or transparent material, that is to say that it forms a translucent or transparent medium. The intermediate portion 20B of the watch 2B is formed by a transparent material and by a translucent diffuser 70 defining the inner surface 52B of the intermediate portion visible through the glass 14. More particularly, the outer portion of the intermediate portion is made of a transparent material and the inner portion 48B of this intermediate portion comprises an internal portion, integral with the outer portion and made of the same transparent material, and the translucent diffuser 70 that forms an inner ring blurring everything that is behind it, particularly the solar cell 30. In particular, the diffuser 70 blurs the contours and reliefs of the objects located behind it for a user who looks at the inner surface 52B through the glass 14. The diffuser may have a certain colour chosen by the designer of the watch. This diffuser may generate a diffusion with an angular opening selected (relative to the direction orthogonal to the inner surface 52B) for the incident visible and/or infra-red light from the space 62, so as to favour a propagation of the visible and/or infra-red light in the intermediate portion 20B in the direction of the solar cell 30. It will be noticed that the first variant of the second embodiment does not have a reflective lower film arranged under the intermediate portion, but the dial 12 advantageously has a reflective surface that is optionally also diffusing.

It will be noted that in one variant not shown of the first embodiment, the intermediate portion may also comprise a translucent diffuser 70 described above. In such a variant of the first embodiment, the gasket is integral with the outer portion and the internal portion, similar to that mentioned above, of the intermediate portion and forms with these outer and internal parts a single portion made of the same transparent material. In a particular variant, the gasket is integral with only the outer portion of the intermediate portion and forms with this outer portion a single portion made of the same transparent material. The inner portion of the intermediate portion is in this latter case formed entirely or partly of a translucent material arranged in such a way as to diffuse the visible and/or infra-red light coming from the space 62 provided for the analogue display. Thus, in general, the gasket is integral with at least one outer portion of the intermediate portion and forms with this at least one outer portion a single portion made of the same transparent material.

Figure 8:
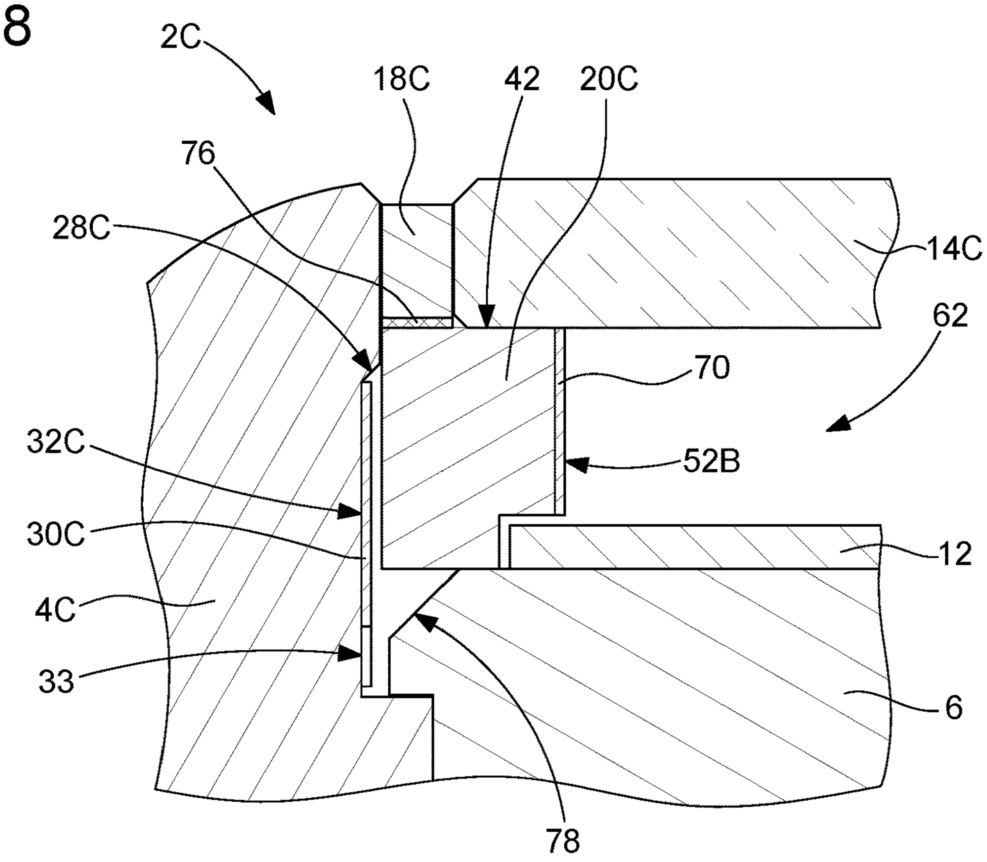
FIG. 8 is a section, according to the same sectional plane as that of FIG. 4, of a second variant of the second embodiment of a watch according to the invention.

FIG. 8 shows in section a watch 2C according to a second variant of the second embodiment. The gasket 18C and the intermediate portion 20C form two distinct parts that are assembled by a glue layer 76 forming a translucent or transparent intermediate medium between the gasket and the intermediate portion. The solar cell 30C is arranged, as in the variants described of the first embodiment, in a recess/bed 28C of the case 4C. The intermediate portion 20C has a lower portion that rests on the edge of the movement 6, or alternatively on a fitting circle of this movement or on a portion of the case having a horizontal surface whereon at least the edge of the dial 12 also rests (as in FIGS. 1-6). This makes it possible to increase the height of the solar cell and increase the amount of light reaching behind the intermediate portion, in particular on the active area 32C, and captured by the solar cell. The intermediate portion here forms a flange that does not bear on the dial, but that covers at a short distance the edge of this dial. As in the embodiment of FIG. 7, the intermediate portion 20C comprises a translucent diffuser 70 defining its inner surface 52B. The gasket 18C is transparent or translucent, as is the glue layer 76. With the exception of the diffuser 70, the intermediate portion 20C is formed of a transparent material. This second variant also has a specific feature by the fact that the solar cell 30C extends partly below the lower level of the dial 12. The movement 6 has a frustoconical peripheral surface 78 that frees up a lateral space to make it possible to propagate light below the lower level of the dial, which makes it possible to also increase the height of the solar cell and increase the amount of incident light behind the intermediate portion that is captured by the solar cell. Thus, the light coming out of the lower surface of the intermediate portion is also captured. Preferably, the frustoconical surface 78 is a metal surface that reflects light. It will be noticed that the glass 14C is a flat glass, as opposed to the domed glass 14 of the embodiments described above.

Figure 9:
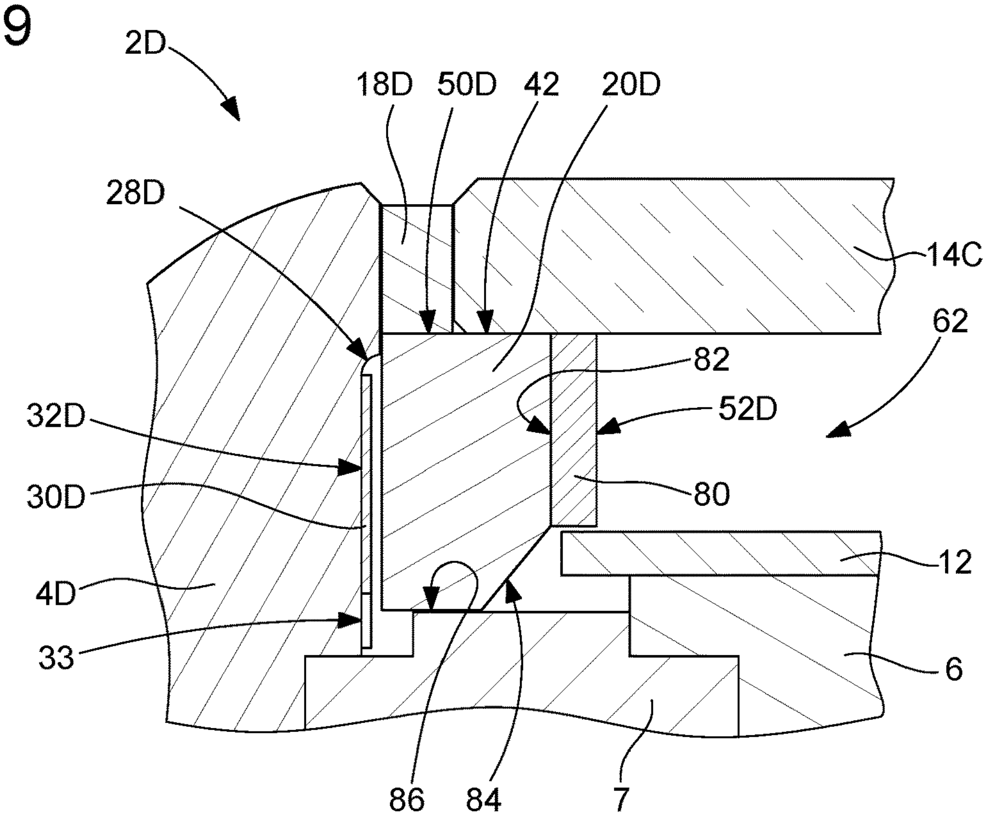
FIG. 9 is a section, according to the same sectional plane as that of FIG. 4, of a third embodiment of a watch according to the invention.

FIG. 9 shows a third embodiment of a watch 2D according to the invention. Not all of the references already described will be described again. This third embodiment is mainly different from the two preceding embodiments by the fact that the intermediate portion 20D comprises an inner ring 80 partially forming the inner portion of the intermediate portion. The inner ring 80 forms an opaque medium. It is preferably formed by a metal and thus has an inner surface 52D that is metal and also an outer surface 82 that is metal and that entirely reflects the light that propagates in the region of the intermediate portion located outside of this inner ring, which is preferably transparent. The gasket 18D is distinct from the intermediate portion, but its lower surface 50D is in contact with the upper surface of the intermediate portion. More precisely, the outer portion of the intermediate portion 20D and the gasket 18B are adjacent. They are axially aligned, substantially without air gap between them although they are not glued to one another. Subsequently, the intermediate portion 20D bears via its lower surface 86 on a fitting circle 7 provided for the movement 6 in the case 4D. Between the lower surface 86 and the metal inner ring 80, the intermediate portion has a frustoconical surface 84. Preferably, the surfaces 84 and 86 are covered by a metal film so as to reflect the incident light from the intermediate portion 20D and thus increase the amount of light that finally arrives on the active area 32D of the solar cell 30D.

In an advantageous variant, the gasket 18B and the transparent portion of the intermediate portion 20D are integral and forms a single portion made of the same transparent material.

The invention claimed is:

1. A watch, comprising:

a case;

a movement provided with an analogue display and defining a main axis of the case that is orthogonal to a general plane of the case;

a glass located above the analogue display;

a gasket arranged at a periphery of the glass between a lateral surface of the glass and an axial wall of the case;

an intermediate portion laterally surrounding the analogue display; and a solar cell extending at least mostly between the movement and the glass and being arranged behind the intermediate portion relative to the analogue display, wherein the intermediate portion is formed at least partially by a translucent or transparent material and is configured so that the visible and/or infra-red light passing through the glass from the outside of the watch propagates in said translucent or transparent material and subsequently reaches the solar cell, wherein the solar cell is arranged in a region located radially beyond a rim of the glass, wherein the intermediate portion defines a radial surface forming an axial stop for a peripheral area of the glass following the inside of the rim, wherein the gasket is formed at least mostly by a translucent or transparent material that defines at least mostly an axial surface against which the lateral surface of the glass presses, the gasket forming with the intermediate portion axially a continuous medium or being axially arranged adjacent to the intermediate portion or being axially separated from the intermediate portion at least mostly by a translucent or transparent intermediate medium, the gasket being configured so that the incident visible and/or infra-red light on an axial surface of the gasket or on an upper surface of the gasket to propagate in the translucent or transparent material that forms it up to a lower geometrical surface or lower surface delimiting at the bottom the gasket, the intermediate portion being arranged to be able to collect mostly the visible and/or infra-red light passing through the lower geometrical surface or lower surface of the gasket and to make it possible for the collected visible and/or infra-red light to propagate in the translucent or transparent material of the intermediate portion and to subsequently reach at least partly the solar cell.

2. The watch according to claim 1, wherein the gasket is integral with at least one outer portion of the intermediate portion and forms with the at least one outer portion a single portion made of the same transparent material.

3. The watch according to claim 1, wherein the gasket is integral with the intermediate portion and forms with the intermediate portion a single part made of the same translucent or transparent material.

4. The watch according to claim 1, wherein the intermediate portion comprises an inner portion delimiting a space for the analogue display, the inner portion comprising a translucent diffuser defining the inner surface of the intermediate portion visible through the glass.

5. The watch according to claim 1, wherein the intermediate portion comprises an inner portion delimiting a space for the analogue display, the inner portion comprising a semi-transparent film defining the inner surface of the intermediate portion visible through the glass, the semi-transparent film being arranged to partially transmit the incident light from said space while masking the solar cell for a user looking at said inner surface through the glass.

6. The watch according to claim 5, wherein the semi-transparent film is arranged to have a metal appearance on a side of said space for the user looking at the inner surface of the intermediate portion through the glass.

7. The watch according to claim 1, wherein the radial surface of the intermediate portion is at least mostly defined by the translucent or transparent material forming the intermediate portion, which is arranged such that the visible and/or infra-red light passing through the radial surface can propagate in the translucent or transparent material forming the intermediate portion and subsequently reach at least partly the solar cell.

8. The watch according to claim 1, wherein the intermediate portion has a lower surface that is covered by a reflective layer, the intermediate portion forming a translucent or transparent medium between at least the lower geometrical surface or the lower surface of the gasket and the reflective layer.

9. The watch according to claim 1, wherein the gasket and the intermediate portion are configured so that, in an axial plane parallel to said main axis, an oblique geometrical line passing through the medium of the active area of the solar cell and the junction point between the radial surface of the intermediate portion and the axial surface of the gasket forms an angle $\alpha$ a value of which is between 35° and 70°, the active area being an area located above an inner electrode and able to capture light.

10. The watch according to claim 9, wherein said value of said angle $\alpha$ is between 40° and 65°.

11. The watch according to claim 1, wherein the intermediate portion forms a spacer between the glass and a dial, of the analogue display, or a flange arranged to rise above an edge of the dial and supporting the glass.

* * * * *